Patented Mar. 7, 1950

2,499,396

UNITED STATES PATENT OFFICE 2,499,396

PARASITICIDAL SYNERGISTIC COMPOSITION OF BENZENE HEXACHLORIDE AND 2·4-DINITRO-PHENOLS

George E. Lynn, Midland, Mich., assignor to The Dow Chemical Company, Midland, Mich., a corporation of Delaware No Drawing. Application August 13, 1945,
Serial No. 610,679

8 Claims. (Cl. 167—30)

This invention relates to parasiticides and is particularly concerned with improved parasiticidal compositions including mixtures of toxicant materials.

Benzene hexachloride (hexachlorocyclohexane) is a known chemical compound, and methods for its preparation and the separation of alpha, beta, gamma, and delta isometric forms of the compound have been described by Van der Linden (1912) Berichte 45, 231–47) and others. The compound was reported by Bender in U. S. Patent No. 2,010,841, dated August 13, 1935, as having insecticidal properties. Since that time, new methods for the production of benzene hexachloride have been developed, and the compound has come to be recognized as an organic insecticidal toxicant of great promise.

While the mixed benzene hexachloride product has insecticidal properties, it has been found that the gamma-isomer is much more effective than the alpha-, beta-, and delta-isomers. Also, the delta-isomer appears to be the substituent of the crude mixture which imparts odor thereto. The preferred gamma-isomer is a white crystalline material melting at 112° C. and having very little odor. This compound is substantially water-insoluble but somewhat soluble in most organic solvents including methanol, carbon tetrachloride, chloroform, ethylene chloride, benzene, toluene, and xylene.

Benzene hexachloride has been reported as toxic against a number of insect pests but is characterized by specificity of action whereby it is substantially ineffective against certain organisms such as red spider and aphis. Also, such amounts of the material are required against some other common insects as make its use economically unattractive. A further disadvantage resides in the fact that the compound appears to have little or no fungicidal and bactericidal toxicity.

It is an object of the present invention to provide improved compositions comprising benzene hexachloride and particularly its gamma-isomer in combination with certain known parasiticidal toxicants. A further object is to provide a such mixture adapted to control insect, mite, and fungus organisms which are not controlled with benzene hexachloride alone. An additional object is to provide mixtures of toxicants wherein the constituents will exert a cooperative action one with the other so as to accomplish the control of common parasites with much smaller amounts of material than would be required with either toxic constituent alone. Additional objects will become apparent from the following specification and claims.

According to the present invention, benzene hexachloride is mixed with a 2.4-dinitro-6-hydrocarbon-phenol or a salt of the latter to obtain improved toxicant compositions. When compounded with a carrier in spray and dust compositions, such mixture exerts a toxicity against insects, mites, and fungi which is greater than additive with respect to that inherent in the constituents of the mixture when employed alone. The mixture is effective against some organisms which are not controlled by either constituent of the mixture. A further advantage resides in the fact that the total amount of the mixed toxicants required to obtain control of certain organisms is less than is required to obtain a like degree of control when either of the constituents is used separately.

The expression "hydrocarbon-substituted 2.4-dinitro-phenols" as herein employed refers to such compounds as 2.4-dinitro-6-methyl-phenol, 2.4-dinitro-5-methyl-phenol, 2.4-dinitro-6-isopropyl-phenol, 2.4-dinitro-6-secondarybutyl-phenol, 2.4-dinitro-6-phenyl-phenol, 2.4-dinitro-6-benzyl-phenol, 2.4-dinitro-6-cyclohexyl-phenol, 2.4-dinitro-5-cyclohexyl-phenol, 2.4-dinitro-6-normaloctyl-phenol. Among the salts of these phenols which may be employed in accordance with the present invention are alkali metal salts such as sodium 2.4-dinitro-6-methyl-phenolate, potassium 2.4-dinitro-6-methyl-phenolate, ammonium 2.4-dinitro-6-methyl-phenolate, ammonium 2.4-dinitro-6-secondarybutyl-phenolate, sodium 2.4-dinitro-6-secondarybutyl-phenolate, ammonium 2.4-dinitro-6-cyclohexyl-phenolate, sodium 2.4-dinitro-6-cyclohexyl-phenolate, potassium 2.4-dinitro-6-cyclohexyl-phenolate, and the like. Also, amine salts of the phenols may be employed, such as dicyclohexylamine 2.4-dinitro-6-cyclohexyl-phenolate, ethylene-diamine 2.4-dinitro-6-cyclohexyl-phenolate (mono-salt), propylene-diamine 2.4-dinitro-6-cyclohexyl-phenolate (di-salt), laurylamine 2.4-dinitro-6-cyclohexyl-phenolate, dioctylamine 2.4-dinitro-6-cyclohexyl-phenolate, benzylamine 2.4-dinitro-6-cyclohexyl-phenolate, triethanolamine 2.4-dinitro-6-cyclohexyl-phenolate, dicyclohexylamine 2.4-dinitro-6-methyl-phenolate, diethanolamine 2.4-dinitro-6-methyl-phenolate, N-benzyl-normalbutylamine 2.4-dinitro-6-methyl-phenolate, monoethanolamine 2.4-dinitro-6-benzyl-phenolate, dicyclohexylamine 2.4-dinitro-6-phenyl-phenolate, dinormalamylamine 2.4-dinitro-6-normalhexyl-phenolate, normaloctylamine 2.4-dinitro-6-normaloctyl-phenolate, and the like. Other suitable salts of the dinitrophenols include calcium 2.4-dinitro-6-cyclohexyl-phenolate, magnesium 2.4-dinitro-6-methyl-phenolate, copper 2.4-dinitro-6-cyclohexyl-phenolate, etc.

When operating in accordance with the present invention, the new toxicant mixtures are commonly employed along with a carrier in the form of spray and dust compositions. Alternately, the mixture of toxicants may be compounded to produce insecticidal concentrates adapted for use in the preparation of spray or dust mixtures.

In the preparation of sprays, the benzene hexachloride and phenolic toxicant may be ground or otherwise intimately mixed one with the other and the resulting mixture dispersed in water or other immiscible solvent. Alternately, the toxicants may be separately dispersed in the liquid carrier. If desired, a solution of the toxicant in an organic solvent may be employed.

In the preparation of dusts, the toxicant mixture or the toxicants separately may be ground or mixed with a finely-divided solid carrier in any suitable manner. A convenient mode of operation comprises dissolving the mixture of toxicants or the toxicants separately in volatile organic solvent, wetting the finely-divided carrier with the resultant solutions, and thereafter evaporating the solvent out of the mixture. Suitable solvents for use in such operation include ethanol, carbon tetrachloride, chloroform, ethylene chloride, benzene, and the like.

In the preparation of concentrates, the mixture of toxicants may be ground with suitable wetting and dispersing agents to obtain products adapted to be dispersed in water or other liquid carrier. Similarly, the toxicants may be dissolved in a water-miscible liquid to produce a concentrate adapted subsequently to be incorporated into aqueous spray mixtures. A further and preferred type of concentrate consists of a dispersion of the toxicants in a finely-divided solid carrier. In such mixture, a high percentage of the toxicant is employed, and the product may be subsequently dispersed in water to produce aqueous spray mixtures or further diluted with additional carrier to produce dusts.

Any suitable proportion of the nitrophenolic toxicant may be employed in combination with the benzene hexachloride. The preferred amounts of materials are dependent upon the type of composition in which the toxicant mixture is to be applied, the nature of the organism to be controlled, the particular nitrophenolic toxicant employed, and whether a crude benzene hexachloride or the pure gamma-isomer is concerned. In general, from about 0.5 to 20 parts by weight of the nitrophenolic toxicant is employed for each part of benezene hexachloride. Within this range of proportions, the compounds appear to exercise a mutual activation one for the other so that compositions containing the mixture are characterized by an effectiveness against insects, mites, and fungi which is greater than additive.

The amount of combined toxicants employed in spray mixtures varies considerably with the particular organism to be controlled and with the percentage of the gamma-isomer of benzene hexachloride in the mixture. In general, from about 0.1 to 10 pounds of toxicants per 100 gallons of water or other liquid carrier gives good results. In dust compositions the mixture should be employed in the amount of from 0.01 to 5 per cent by weight of the ultimate composition with due regard to the proportions of toxicants one to the other. Depending upon whether a concentrate is in the form of a solution, dust, dispersion, or simple mixture of the combined toxicants with wetting and dispersing agents, from 5 to 98 per cent by weight of the toxicants may be employed therein.

Any suitable wetting, emulsifying, or dispersing agent may be used with the toxicant mixture provided only that it accomplish the end desired and not be reactive with the ingredients of the mixture. Representative products which have been found satisfactory include sulfonated castor oil, sulfite waste liquor (Goulac), sodium lauryl sulfate, dioctyl sodium sulfosuccinate (Aerosol-OT), polyoxyalkylene derivatives of sorbitan trioleate (Tween 85), polyethylene glycol-phenyl-isooctyl ether (Triton-X-100), etc. In the preparation of liquid concentrates, miscible solvents such as methanol, acetone, and the like, are conveniently employed. In spray compositions, a toxicant mixture may be dispersed or dissolved in oil-water emulsion compositions, alcohol, acetone, chlorinated hydrocarbons, kerosene, and the like, instead of water.

Solid carriers which may be employed in the preparation of dust or concentrated products include diatomaceous earth, clays, talc, charcoal, gypsum, wood flour, pyrophyllite, volcanic ash, and the like.

The mixtures of benzene hexachloride and nitrophenolic toxicant and compositions in which they are incorporated may be further modified with other parasiticidal materials. Representative of such further toxic additaments are rotenone, pyrethrins, organic thiocyanates, lead arsenate, nicotine sulfate, sulfur, and the like.

The preferred embodiment of the invention resides in toxicant mixtures containing the gamma-isomer of benzene hexachloride in essentially pure form. Such products are not characterized by the odor common to the mixed isomeric benzene hexachlorides. Also, much smaller amounts of the gamma-isomer are required than when mixtures containing the relatively inert alpha-, beta-, and delta-isomers are concerned.

The following examples illustrate the invention but are not to be construed as limiting:

*Example 1*

10 parts by weight of benzene hexachloride gamma-isomer, 10 parts of 2.4-dinitro-6-cyclohexyl-phenol, and 80 parts of a Georgia clay (marketed as Secco) were ground and mixed together and employed as a parasiticidal concentrate. Varying amounts of this product were dispersed in water to obtain spray mixtures which were applied for the control of third instar larvae of the Mexican bean beetle on cranberry bean plants. The plants were examined 72 hours after treatment. With a mixture containing ¼ pound each of the toxicants per 100 gallons, only 5 per cent of the foliage was consumed by the organism. With a mixture containing ⅛ pound each of the toxicants per 100 gallons, only 10 per cent of the foliage was eaten. In control determinations, the foliage was substantially completely consumed.

Comparative applications were made employing a concentrate containing 20 parts of 2.4-dinitro-6-cyclohexyl-phenol in 80 parts of the Georgia clay and one containing 20 parts of the gamma-isomer of benzene hexachloride in 80 parts of the Georgia clay. When the nitrophenolic concentrate was dispersed in water to give ⅛ pound of the 2.4-dinitro-6-cyclohexyl-phenol per 100 gallons and applied to the bean plants, the beetle larvae consumed 60 per cent of the foliage. In comparable concentration, the benzene hexachloride concentrate permitted the consumption of 20 per cent of the foliage.

Example 2

The compositions as disclosed in Example 1 were similarly applied for the control of the larvae of Southern army worm on cranberry bean plants. At ¼ pound each of 2,4-dinitro-6-cyclohexyl-phenol and benzene hexachloride gamma-isomer per 100 gallons, a kill was obtained of 100 per cent with only 10 per cent of the bean foliage eaten. The 2,4-dinitro-6-cyclohexyl-phenol alone at ¼ pound per 100 gallons gave 0 per cent control and permitted the consumption of 100 per cent of the foliage by the larvae. The comparable spray containing the benzene hexachloride gamma-isomer alone killed only 80 per cent of the organism. These observations were made 72 hours after treatment of the plants.

Example 3

In a similar fashion, the composition of benzene hexachloride gamma-isomer and 2,4-dinitro-6-cyclohexyl-phenol in clay as described in Example 1 was dispersed in water to obtain aqueous spray mixtures which were applied for the control of adult greenhouse red spider on the foliage of the cranberry bean. 72 hours after treatment of the bean plants with a composition containing ⅛ pound each of the toxicants, the plants were inspected and it was found that a 96 per cent control of the organism had been obtained. In comparative operations, compositions containing up to ½ pound of the benzene hexachloride per 100 gallons gave less than 25 per cent control of the red spider.

Example 4

A composition is prepared by mixing together 4 parts of mixed benzene hexachlorides containing 10–12 per cent by weight of the gamma-isomer and melting at 90°–195° C., 1 part of dicyclohexylamine 2,4-dinitro-6-cyclohexyl-phenolate, 15 parts of gypsum, and 0.2 part of sodium lauryl sulfate. This product is ground and fluffed to obtain a dust concentrate. The mixture is dispersed in water at the rate of 4 pounds per 100 gallons and applied to apple trees for the control of red mite.

Example 5

1 part of 2,4-dinitro-6-secondarybutyl-phenol, 6 parts of crude mixed benzene hexachlorides (as described in Example 4), 40 parts of finely-divided sulfur, and 53 parts of pyrophyllite are mixed together to produce a dust mixture. This product is applied with conventional dusting equipment to standing beans and potatoes for the control of leaf hoppers at the rate of from 40 to 50 pounds per acre.

Example 6

1.5 parts of dicyclohexylamine 2,4-dinitro-6-cyclohexyl-phenolate, 0.2 part of benzene hexachloride gamma-isomer, and 98.3 parts of pyrophyllite are ground together to produce a dust composition. This product is applied with conventional dusting apparatus to citrus trees for the control of citrus red mite.

Example 7

20 parts of 2,4-dinitro-6-methyl-phenol, 10 parts of the mixed benzene hexachloride product described in Example 4, 66 parts of diatomaceous earth, and 4 parts of sulfite pulping waste (Goulac) are ground together to produce an insecticidal and ovicidal concentrate. Aqueous dispersions of this product are applied for the control of rose aphis, early infestation of green aphis, and bud aphis on apples and black aphis on cherries. This mixture is applied to the trees at 1.25 pounds per 100 gallons of water as a dormant spray. For control of San Jose scale, scurvy scale, oyster shell scale on apples, and pear psylla on pears, the mature trees are treated with the composition at the rate of 1 pound in 100 gallons of a 2 per cent oil emulsion.

Example 8

2.0 parts by weight of 2,4-dinitro-6-benzyl-phenol, 0.5 part of benzene hexachloride gamma-isomer, and 97.5 parts of oil are mixed together to produce a liquid insecticidal mixture. This product is dispersed in water at the rate of from 1.5 to 2 gallons of the concentrate per 100 gallons of aqueous spray and applied as a dormant spray for the control of aphis infestation on apples, cherries, and currants.

Example 9

0.5 part of 2,4-dinitro-6-cyclohexyl-phenol, 1.0 part of an isomeric mixture of benzene hexachloride containing approximately 12 per cent of the gamma-isomer, and 98.5 parts of a finely-divided dusting sulfur are ground together. The resulting dust mixture is conveniently applied as a greenhouse dust at the rate of 1 pound to each 400 to 800 square feet of bench space with either hand or power duster to accomplish the control of red spiders, mites, and thrips on carnations. This material also gives excellent control of rust infestation on carnations.

Example 10

1.5 parts of laurylamine 2,4-dinitro-6-cyclohexyl-phenolate, 2 parts of the crude benzene hexachloride product as described in the preceding example, and 96.5 parts of volcanic ash are compounded together. This is accomplished by mixing and spraying the volcanic ash with solutions in benzene of 2,4-dinitro-6-cyclohexyl-phenol, laurylamine, and the benzene hexachloride, and thereafter volatilizing off the benzene. The resulting product is applied to orange trees for the control of thrips and citrus red mite. It is also effective against common red spider, the Pacific mite, and the brown almond mite, occurring on peaches, plums, prunes, pears, almonds, walnuts, cherries, grapes, hops, beans, and cotton. The product is generally dusted at the rate of from 25 to 35 pounds per acre.

I claim:

1. A parasiticidal composition including as active toxicants benzene hexachloride and one of the group consisting of the hydrocarbon-substitued 2,4-dinitro-phenols and their salts, and wherein the mixture of toxicants exerts a synergistic effect as regards parasiticidal toxicity.

2. A parasiticidal composition including as active toxicants the gamma-isomer of benzene hexachloride and one of the group consisting of the hydrocarbon-substituted 2,4-dinitro-phenols and their salts, and wherein the mixture of toxicants exerts a synergistic effect as regards parasiticidal toxicity.

3. A parasiticidal composition including as active toxicants the gamma-isomer of benzene hexachloride and a hydrocarbon-substituted 2,4-dinitro-phenol, and wherein the mixture of toxicants exerts a synergistic effect as regards parasiticidal toxicity.

4. A parasiticidal composition including as active toxicants the gamma-isomer of benzene hexachloride and 2.4 - dinitro - 6 - cyclohexyl-phenol, and wherein the mixture of toxicants exerts a synergistic effect as regards parasiticidal toxicity.

5. A parasiticidal composition including as active toxicants the gamma-isomer of benzene hexachloride and 2.4-dinitro-6-methyl-phenol, and wherein the mixture of toxicants exerts a synergistic effect as regards parasiticidal toxicity.

6. A parasiticidal composition including as active toxicants the gamma-isomer of benzene hexachloride and an amine salt of a hydrocarbon-substituted 2.4-dinitro-phenol, and wherein the mixture of toxicants exerts a synergistic effect as regards parasiticidal toxicity.

7. A parasiticidal composition including as active toxicants the gamma-isomer of benzene hexachloride and an alkali metal salt of a hydrocarbon-substituted 2.4 - dinitro - phenol, and wherein the mixture of toxicants exerts a synergistic effect as regards parasiticidal toxicity.

8. A parasiticidal composition including as active toxicants benzene hexachloride and one of the group consisting of the hydrocarbon-substituted 2.4-dinitro-phenols and their salts, and wherein from 0.5 to 20 parts by weight of the nitrophenolic toxicant is employed for each part of benzene hexachloride, and the mixture of toxicants is synergistic.

GEORGE E. LYNN.

REFERENCES CITED

The following references are of record in the file of this patent:

UNITED STATES PATENTS

| Number | Name | Date |
|---|---|---|
| 1,045,110 | Ellis | Nov. 19, 1912 |
| 1,947,926 | Steindorff et al. | Feb. 20, 1934 |
| 2,010,841 | Bender | Aug. 13, 1935 |
| 2,378,309 | Lynn et al. | June 12, 1945 |

OTHER REFERENCES

Bory et al., Bulletin de l'Academie de Medicine, vol. 127 (1943), page 729.